United States Patent
Csendes

[19]

[11] Patent Number: 6,135,371

[45] Date of Patent: Oct. 24, 2000

[54] METHOD AND APPARATUS FOR REDUCING ACID AND AIR TOXIC EMISSIONS IN THE COMBUSTION OF COMMINUTED SOLID PARTICLES

[76] Inventor: Ernest Csendes, 514 Marquette St., Pacific Palisades, Calif. 90272

[21] Appl. No.: 09/398,296

[22] Filed: Sep. 20, 1999

Related U.S. Application Data

[63] Continuation of application No. 09/339,476, Jun. 24, 1999, abandoned.

[51] Int. Cl.$^7$ ............................. B02C 19/12; B02C 23/24
[52] U.S. Cl. ........................... 241/15; 241/19; 241/24.31; 241/48; 241/52; 241/56; 241/79.1; 241/162
[58] Field of Search .................................. 241/19, 24.31, 241/48, 52, 56, 59.1, 79.1, 79.3, 78, 154, 161, 162, 15, 38

[56] References Cited

U.S. PATENT DOCUMENTS

| | | | |
|---|---|---|---|
| 5,174,512 | 12/1992 | Orlandi | 241/72 |
| 5,695,130 | 12/1997 | Csendes | 241/19 |
| 5,947,599 | 9/1999 | Funk | 241/162 X |

*Primary Examiner*—John M. Husar
*Attorney, Agent, or Firm*—Edward A. Sokolski

[57] ABSTRACT

A cylindrical chamber has a drive shaft rotatably mounted therein and extending along substantially the entire longitudinal extent thereof. This drive shaft is rotatably driven by a motor preferably at a speed of about 3600 rpm. Solid particles to be comminuted which may be of coal, limestone/dolomite, or hydrated lime are fed into the chamber. Pressurized air is fed into the bottom of the chamber. Uplifting pressure for driving the air and particles upwardly in the chamber may be provided by pressurized gas in conjunction with a stationary velocity head. The upwardly driven particles are first driven through a plurality of rotors which are driven by the shaft and provide a centrifugal force which comminutes the particles. The particles are then driven through a plurality of semi-permeable screens which are rotatably driven by the shaft and further comminute the particles to a micronized state. To lower $NO_x$ and $SO_2$ emissions when the micronized particles are combusted, the surfaces of the particles are modified by spraying with an aqueous atomized spray of an agent such as ethylene glycol or magnesium acetate which is injected into the chamber. Second chamber similar to the first. The reduction of acid gases and air toxics in the flue gases emitted from coal fired boilers is completed through duct injections of selected reagents.

18 Claims, 6 Drawing Sheets

METHOD AND APPARATUS FOR REDUCING ACID AND AIR TOXIC EMISSIONS IN THE COMBUSTION OF COMMINUTED SOLID PARTICLES

This application is a Continuation in Part of my application Ser. No. 09/339,476 filed Jun. 24, 1999 now abandoned.

BACKGROUND OF THE INVENTION

1. Field of the Invention

This invention relates to a method and apparatus for comminuting solid particles and more particularly to such a method and apparatus in which the presence of acid gas and air toxics with the combustion of such particles is minimized.

2. Description of the Related Art

Micronized limestone is used in agriculture, industrial fillers, environmental controls and the construction trade. Micronized cement is useful in the building industry.

Micronized coal is used as an energy source in the generation of electricity while minimizing the $NO_x$ in the flue gases. Micronized limestone/dolomite or hydrated lime are used for $SO_2$ cleanup in the flue gases of power plants. Micronized coal burns with a flame velocity similar to natural gas or fuel oil and with a short flame that allows the heat energy generated in the combustion to be readily transferred to the water walls of the boiler. This results in an increased boiler rating and less heat losses through the ducts and flue stack. Due to its large surface area, micronized coal is more volatile than pulverized coal. In staged combustion processes, micronized coal leads to a much deeper $NO_x$ control with low $NO_x$ burners in the main combustion zone of the boiler. In addition micronized coal provides a more complete carbon burnout in the fuel and therefore upon combustion yields a micronized fly ash with low carbon content which is of considerable value in the construction industry as a substitute for cement in high strength concrete formulations.

The combustion of micronized coal requires no excess air and results in minimized $NO_x$ in the flue gases. Micronized limestone, dolomite or hydrated lime are most valuable in the dry hot scrubbing of flue gases and afford effective aqueous scrubbing thereof as these particles have much larger reactive surfaces for the $SO_2$ scrubbing. This results in a more complete utilization of the sorbents resulting in substantial savings in the flue gas clean up section of a power plant in conforming to the requirements of the Clean Air Act.

The use of micronized coal as the fuel for generating electric power in conjunction with micronized limestone/dolomite or hydrated lime for flue gas clean up thus has significant advantages over the use of conventional fuels such as fuel oil or pulverized coal and is much less expensive than natural gas.

In my U.S. Pat. No. 5,695,130 issued Dec. 9, 1997, a grinding system is described in which rotating screens with wide mesh openings are first used to comminute particulate material through spiral vortexes and such comminuted material is then fed to circular vortexes formed between rotating discs and stationary plates where the final grinding of the particulate material is accomplished and the final comminuted material is separated from the gas streams by centrifugal fans. In this patent, the control of $SO_2$ and $NO_x$ in the main combustion zone of a boiler is described, this by co-firing micronized coal and micronized limestone, the active scrubbing agent being $CaC_2$ which is formed in situ in the flames.

In my co-pending application Ser. No. 09/339476 now abandoned of which the present invention is a continuation in part, a micronization process and apparatus is described which employs an externally pressurized fluid bed where coarse grinding is accomplished with centrifugal air vortexes generated by fast rotating rotors. The coarser particles are recycled from the pressurized stream by fast rotating screens for further comminution; the passing finer particles are driven through a vertical stack of fast rotating screens which effect the superfine and ultra fine grinding of such particles without external classifiers and recycling. The system and method of the present invention applies the basic technology of my prior patent application in implementing the micronization of solid particles such as coal, limestone/dolomite, hydrated lime, and other sorbents by passing the modified micronized particles through a vertical stack of fast rotating screens wherein homogenization and further micronization take place and compounding of the products occurs with additional sorbents and catalysts while fresh surfaces are being created. A significant improvement is provided in the present invention by the surface modification of such particles with the injection of specific chemicals and sorbents onto the particles to scrub their surfaces which results in a substantial lowering of the $NO_x$ and $SO_2$ in the emissions from the combustion residue.

In a US Department of Energy publication entitled Clean Coal Technology Demonstration Program, published in March, 1999, the commercial scrubbing of $NO_x$ and $SO_2$ is described. Various approaches are described. In one of these approaches $SO_2$ is removed by employing aqueous slurries of hydrated lime ("Gas Suspensions Absorption," "Confined Zone Suspension") or the aqueous suspension of limestone ("Advance Flue Gas Desulfurization," "Confined Zone Suspension"). Dry injection of limestone may be done in the upper reaches of the boiler and an "activator reactor" may be employed where water is injected to complete the scrubbing action("LIFAC Injection Desulfurization"). This dry injection approach is claimed to remove about 70% of the $SO_2$ as compared with 95% removal in the present invention.

Another approach described to lower $NO_x$ emissions employs "Low-$NO_x$" burners providing a staged combustion of the fuel with an oxygen deficient medium in the main combustion zone and completes the process with "overfire air" by creating an oxygen rich medium above the reburn zone, in the burnout zone of the boiler. This process is claimed to reduce the $NO_x$ by about 68% as compared with 90% removal in the present invention. Still another approach described is "micronized coal reburn" wherein micronized coal and recycled flue gas are injected into the reburn port of the boiler, i.e. above the main combustion zone and below the burnout zone of the boiler. This is claimed to yield up to a 56% removal of $NO_x$ as compared with up to 90% removal in the present invention:

A reduction in $NO_x$ comparable to that in the present invention can be obtained by a "Selective Catalytic Reduction" but this approach is very costly(estimated at more than three times the cost involved in the use of the present invention). Also, processing difficulties have been experienced with this approach in that the heavy metal catalysts present in the form of ceramics and zeolites are mechanically and thermally fragile as to long term exposure in the boiler medium, and the dust inherent in the flue gases is deposited on these catalysts and requires removal with soot blowers or sonic horns.

Still another approach described in this report for the simultaneous removal of $SO_2$ and $NO_x$ from the residue is known as the "Milliken Clean Coal Demonstration Project." In one system described, urea injection in the boiler for $NO_x$ reduction of 42% and wet scrubbing with hydrated lime to provide an $SO_2$ reduction of up to 98% is utilized. In another system called the "NOXSO Flue Gas Cleanup," a high temperature fluidized bed absorber with porous alumina beads impregnated with molten sodium carbonate is employed. This system is claimed to provide a 75% $NO_x$ reduction and a 98% $SO_2$ reduction. It is, however, quite expensive due to the required high temperature regeneration of the sorbent with natural gas.

Other approaches described in the report include the "LIMB Extension Coolside Flue Gas Cleanup" which uses low-$NO_x$ burners, the injection of limestone in the upper reaches of the boiler, above the "overfire air" and additional duct injection of hydrated lime and sodium hydroxide resulting in a $NO_x$ reduction of 70% and an $SO_2$ reduction of 70%; the "Gas Reburn Sorbent Injection" using 20% of the fuel as natural gas injected in the reburn port followed by sequential duct injections of hydrated lime, sodium carbonate, and water which results in a $NO_x$ reduction of 75% and an $SO_2$ reduction of 60%; the "Integrated Dry $NO_x/SO_2$ Emission Control System" which provides a $NO_x$ reduction of 80% and an $SO_2$ reduction of 70%; the "SOX-NOX-ROX-BOX" process using duct injection of hydrated lime and sodium carbonate for $SO_2$ control and duct injection of ammonia for $NO_x$ control associated with a "Hot Baghouse" containing assorted heavy metal catalysts which results in a $NO_x$ reduction of 90% and an $SO_2$ reduction of 90%; and the "SNOX Flue Gas Cleaning" process wherein ammonia is injected in the flue gases with a "first catalytic converter" for $NO_x$ cleaning and a "second catalytic converter" for converting $SO_2$ to $SO_3$ (with the isolation of concentrated sulfuric acid as a co-product) which results in a reduction of $NO_x$ of 94% and an $SO_2$ reduction of 95%.

Most of these prior art systems are incapable of producing the $NO_x$ and $SO_2$ reduction of the present invention. Those which are capable of high level reduction such as "Selective Catalytic Reduction," "SNOX Flux Gas Cleaning," and "SOX-NOX-ROX-BOX" are much more expensive to implement than the system of the present invention. Further, they present problems in that the assorted heavy metal catalytic particles are degraded in the course of operations resulting in a costly replacement of the spent catalytic columns. Further, their disposal requires costly procedures for toxic waste of heavy metals and their compounds. Injection of gaseous ammonia into the flue gases creates additional risks as the presence of $SO_3$ and moisture reacts with the ammonia to yield ammonium bisulfate, which tends to corrode the metallic ducts of the boiler.

SUMMARY OF THE INVENTION

The system and method of the present invention affords a significant improvement over the prior art in reducing $NO_x$ and $SO_2$ emissions to +90% removal from base level in that it is significantly more economical and efficient than prior art systems capable of such high level emission reduction. This improved emission reduction is accomplished in two stages. The first stage uses micronized particles with surface modification and added micronized scrubbing agents injected with recycled flue gas or air into the main combustion zone or reburn zone to accomplish emission reductions of up to 85%. The second stage uses duct injections of a combination of new reagents to polish emissions to achieve a +90% removal level.

These low cost reagent combinations for duct injections which absorb all acid gases and also bind the toxic components present in the flue gas stream have not be used in the prior art. The first stage of the above indicated emission reduction is achieved by first comminuting particles of materials such as coal, limestone/dolomite, or hydrated lime to a micronized state. The solid particles are fed into the bottom of a chamber having a plurality of serially arranged semi-permeable screens which preferably are rotatably driven at a speed of about 3600 rpm. Pressurized gas is provided to drive the particles upwardly towards a plurality of rotors driven at the same speed as the semi-permeable screens. A stationary velocity head is provided at the bottom of the chamber to form a uniform air curtain directed upwardly along the inner wall of the chamber.

The rotors provide a centrifugal drive force which comminutes the particles and the pressurized air drives them through the screens for further comminution to a micronized state. The micronized particles are then sprayed with an aqueous atomized spray of an agent such as ethylene glycol or magnesium acetate which is injected into the top of the chamber which in effect "polishes" such particles by modifying their surfaces. The micronized polished particles are either then fed directly to a boiler for combustion or may be further homogenized and comminuted to create fresh and reactive particle surfaces in a second chamber similar to the first where additional finely comminuted sorbents are added to adhere to the surfaces of such particles. The modified micronized particles are found to leave a combustion residue which after duct injections yield a 90% reduction in $NO_x$ and a 95% reduction in $SO_2$ emissions.

It is therefore an object of this invention to provide a system and method for comminuting particles and surface modifying such particles to minimize $NO_x$ and $SO_2$ emissions when such particles are combusted, combined with sequential duct injections that reduce such emissions to the highest possible removal rate consistent with the operating parameters of a boiler.

It is a further object of this invention to provide a more efficient and less expensive system and method for treating comminuting particles so as to reduce $NO_x$ and $SO_2$ emissions when such particles are combusted and completing the reduction of all acid gases and trace components of air toxics in the flue gases.

Other objects of the invention will become apparent in view of the following description taken in connection with the accompanying drawings.

DETAILED DESCRIPTION OF THE INVENTION

Figure 1:
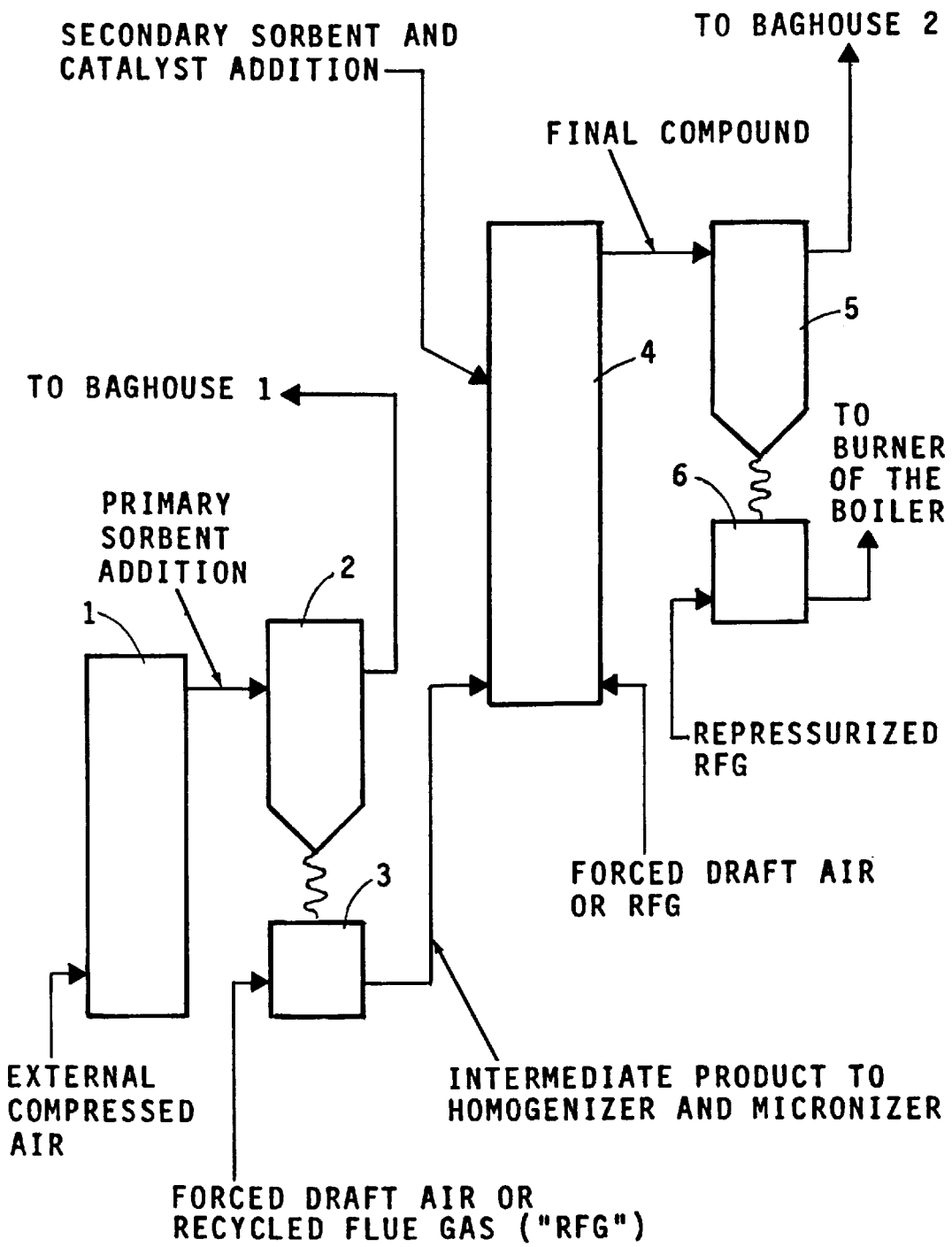
FIG. 1 is a flow chart illustrating the operation of a preferred embodiment of the invention.

Referring now to FIG. 1, a preferred embodiment of the system of the invention is schematically illustrated. This schematic illustrates the preparation of the micronized particles and micronized sorbents, the surface modification of such particles and their compounding with primary sorbent additives; their "homogenization-micronization-" and their further modification to a final composition that is conveyed with repressurized recycled flue gas or air to the burner of a boiler.

Micronizer 1 is similar to that of FIGS. 7–9 of application Ser. No. 09/339476 filed Jun. 24, 1999 now abandoned, of which the present application is a continuation in part. Particles of coal or sorbent ¼"–⅜" in size are fed from a feed hopper(not shown) by means of a variable speed screw feeder(not shown) to the micronizer and fall into the bottom thereof by gravity. As to be explained in detail with reference to FIG. 2, the particles of coal or other material are comminuted in the micronizer and the surfaces of the particles modified by the injection of an aqueous solution in the form of an atomized spray of an agent such as ethylene glycol, other polyhydroxy compound such as glycerol, fructose, glucose, sucrose, maltose sorbitol,etc., or magnesium acetate. A sorbent additive(primary additive) in a finely ground form which may comprise micronized hydrated lime is fed into the exit duct of the micronizer which feeds the comminuted material to cyclone 2.

The cyclone collects the "intermediate" product which can be utilized for certain purposes, but is not fully comminuted. The exit air stream from the cyclone which may contain small amounts of very fine particles is fed to "baghouse 1" prior to outside venting. The intermediate compound collected by the cyclone is fed into Product Receiver 3 from where it is conveyed by forced draft air or recycled flue gas to the bottom of homogenizer and micronizer 4, which is shown in detail in FIG. 3. Homogenizer and micronizer 4 further micronize the material, the finally micronized product being fed to cyclone 5. The cyclone feeds micronized particles to final compound receiver 6 from where such particles are fed to a burner or boiler for utilization. The exhaust from the cyclone that may contain small amounts of very fine particles is fed to "baghouse 2" before the air/flue gas carrier employed in the process is vented to the outside.

Figure 2:
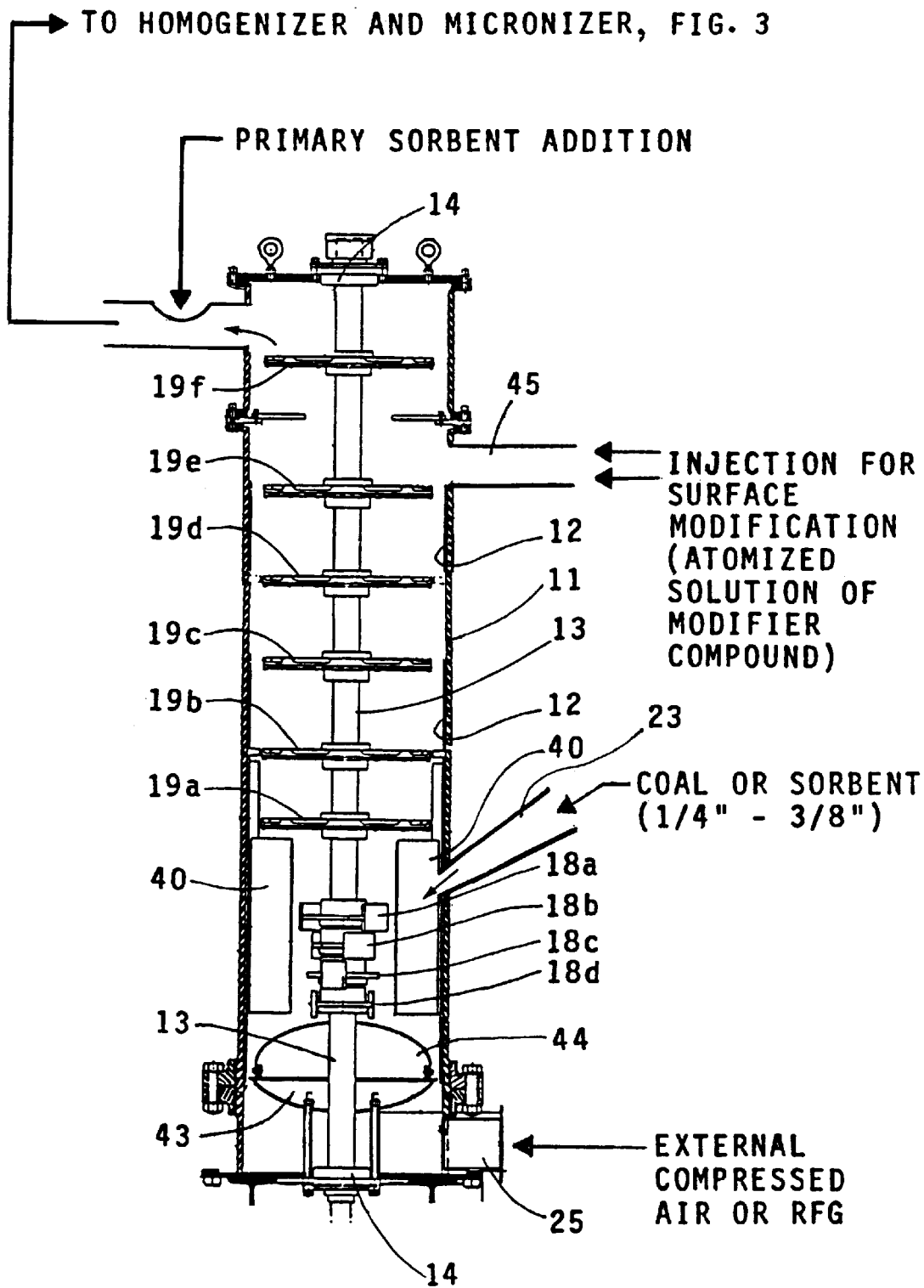
FIG. 2 is a side elevational view illustrating the micronizing chamber of the preferred embodiment.

Referring now to FIG. 2, a micronizer is illustrated. As previously noted, this micronizer is similar to that disclosed in application Ser. No. 09/339476 now abandoned of which the present application is a continuation in part.

Chamber 11 which is cylindrical is maintained in an air tight condition. The walls 12 of the chamber are lined with a material such as rubber or neoprene. Drive shaft 13 is mounted for rotation within the chamber on bearings 14 and is rotatably driven by a motor(not shown) preferably at a speed of 3000–5000 rpm. Connected to shaft 13 for rotation therewith are rotors 18a–18d and semipermeable screens 19a–19f.

Solid particles which may be of coal, limestone, or other sorbent on the order of ¼" in diameter and which may have a surface moisture content of 2–10% are fed from a feed hopper(not shown) by means of a screw feeder (not shown) into feed port 23.

Pressurized gas(preferably air) is fed through inlet tubing 25 into the bottom of the chamber to stationary velocity head 43 which has a domed portion 44. This velocity head is in the shape of a reverse semi-ellipsoidal tank. The pressurized flow of air into the inlet 25 at the bottom of the chamber 11 is distributed by velocity head 43 in the form of an annulus providing a uniform air curtain directed upwardly along the inner wall of the chamber 11. Based on Stokes law, in order to adequately suspend ¼" feed particles, a vertical velocity of 75 ft./sec is required. This is accomplished by employing an annulus thickness for head 43 in the range of ¼" to ⅜." The gas velocity needed will vary with the specific density of the feed; e.g. limestone between 3000–3600 cfm; coal between 1700–2800 cfm.

The use of the stationary velocity head 43 in lieu of an air uplift provides a more efficient air movement. Further, this approach eliminates the need to expose a fan to the turbulent stream of particles with the resultant erosion of the fan blades requiring frequent repair or replacement.

Extra high apex vertical flow enhancers 40 are installed in the walls of the chamber to enhance the flow of fluid. The blades of rotors 18a–18c are designed so that they do not impact on the particles in the fluid bed but rather transmit the kinetic energy which they generate into the air stream between the blades and the inner wall of the chamber which performs the comminuting action by virtue of the centrifugal forces generated in the air stream. As the particles decrease in size, the effect of the centrifugal force decreases, and the flow dynamics carries the reduced size particles towards the rotating semi permeable screens 19a–19f. The slower moving larger particles are repulsed by the screens and driven back down for regrinding. The smaller particles which pass through the screens are exposed to the vertical spiral air vortexes created by the rotating screens.

Directly above semi permeable screen 19e, an aqueous solution of a modifying agent such as ethylene glycol, other polyhydroxy compound, or magnesium acetate, in the form of an atomized spray is fed into the chamber through inlet 45. As already noted this modifying agent polishes and modifies the particles to substantially lessen the $NO_x$ and $SO_2$ emissions. A micronized hydrated lime scrubbing agent is injected into the particles as they are exited from the chamber to the cyclone(see FIG. 1).

Figure 3:
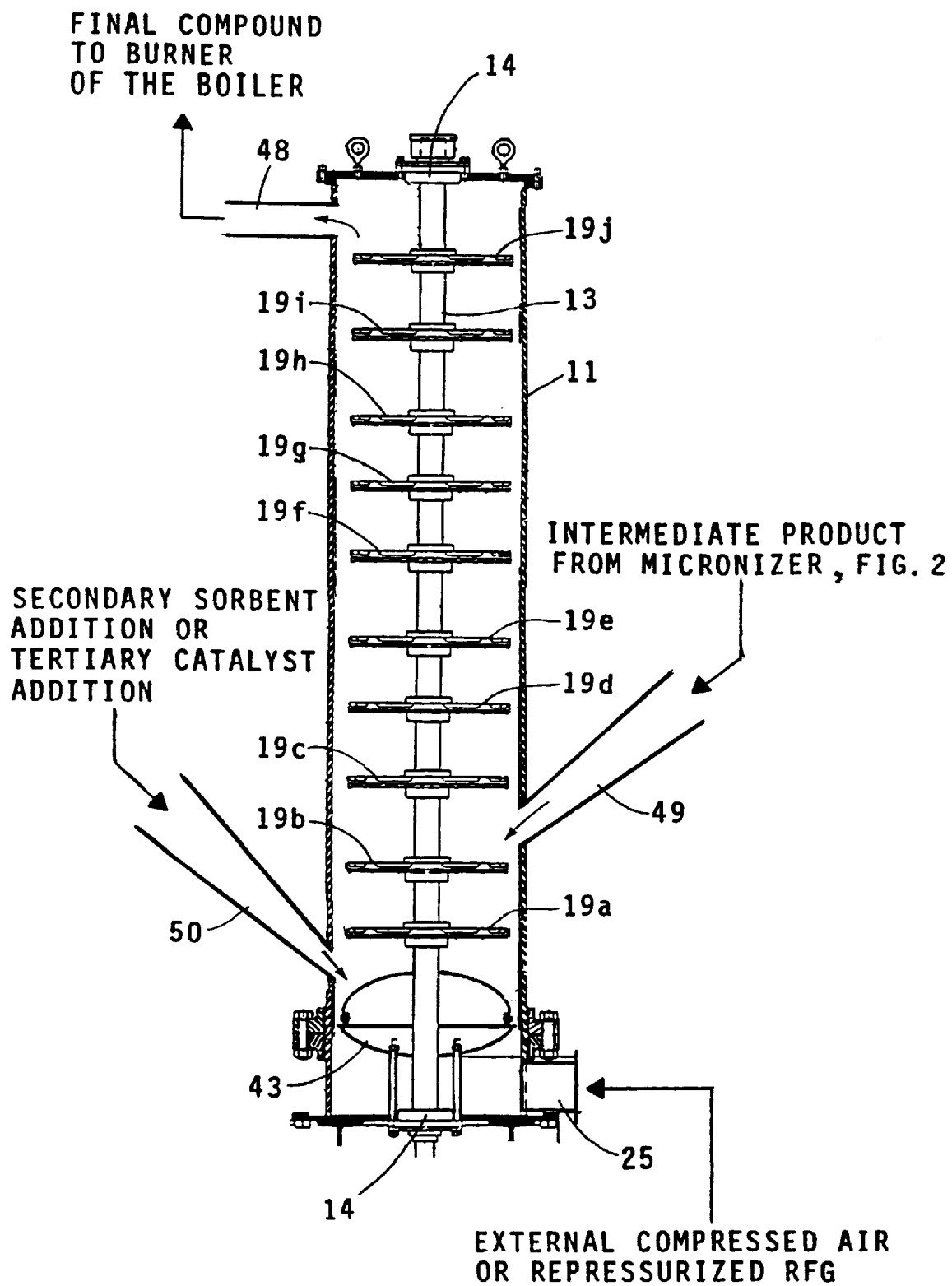
FIG. 3 is a side elevational view of a homogenizer-micronizer for providing additional sorbents and further micronizing the output of the micronizer of FIG. 2 to create fresh reactive particle surfaces.

Referring now to FIG. 3, a homogenizer and micronizer is illustrated. This unit is basically similar to that illustrated in FIG. 2 and is employed to homogenize and additionally micronize the particles to create fresh particle surfaces after the initial surface modification and primary additive combination have occurred. This unit differs from the first in that it does not employ rotors(18a–18d) but rather has ten semi permeable screens 19a–19j which are rotatably driven by drive shaft 13 at the same speed as for the screens of the unit of FIG. 2. As for the first micronizer, external compressed air is fed into the bottom of the chamber through inlet 25 and a domed stationary velocity head 43 is employed to develop the upward air flow. The micronized product is fed into the chamber from cyclone 2(see FIG. 1) through inlet 49. A secondary sorbent additive or tertiary catalyst additive can be fed into the chamber through inlet 50 if so desired. The output of the chamber is fed out of the top thereof through port 48(see FIG. 1) to cyclone 5 and from there to compound receiver 6 to be delivered to the injection port of a boiler.

Figure 4:
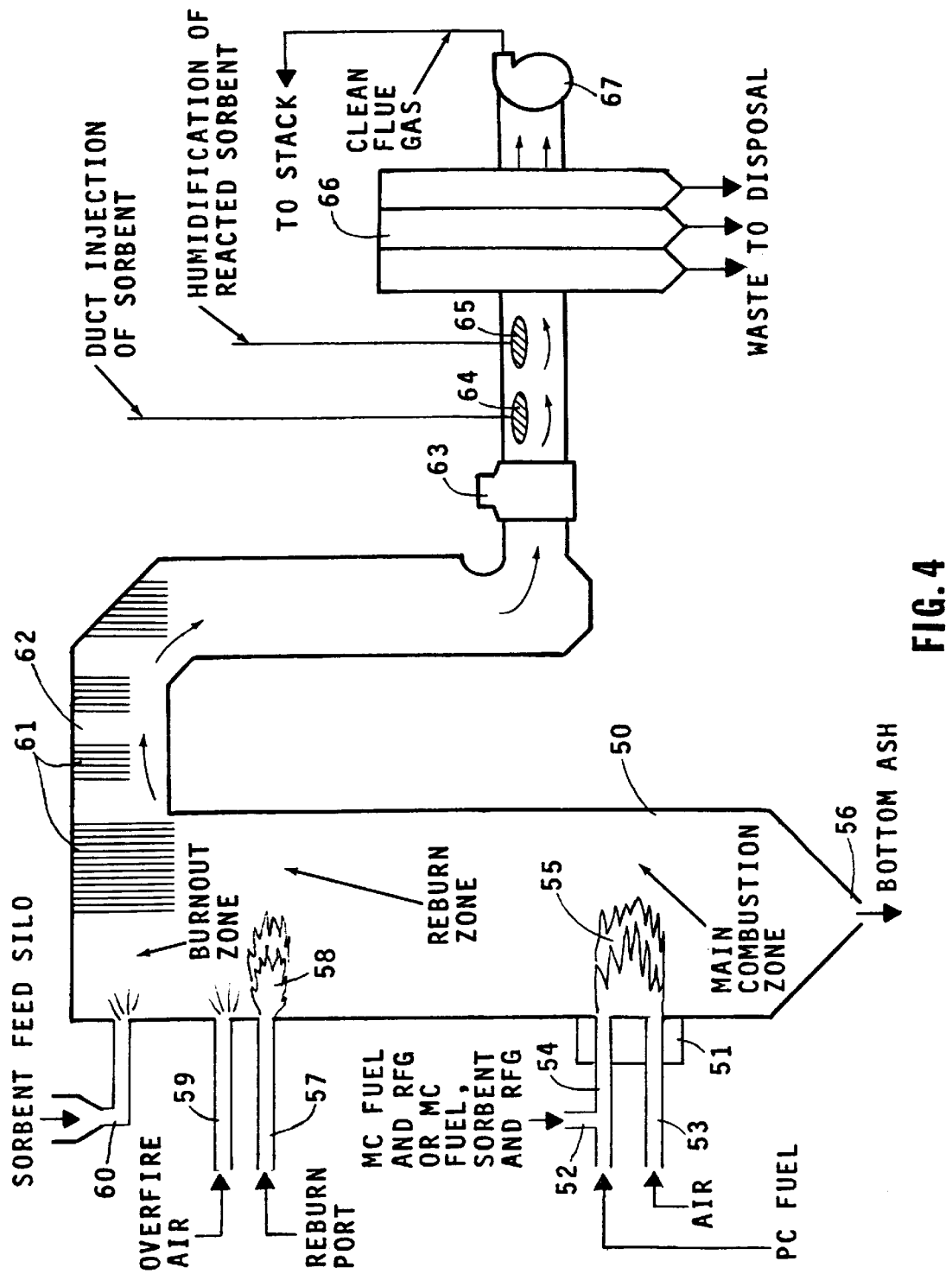
FIG. 4 is a schematic drawing of a boiler system which may be employed in the system of the invention.
Figure 5:
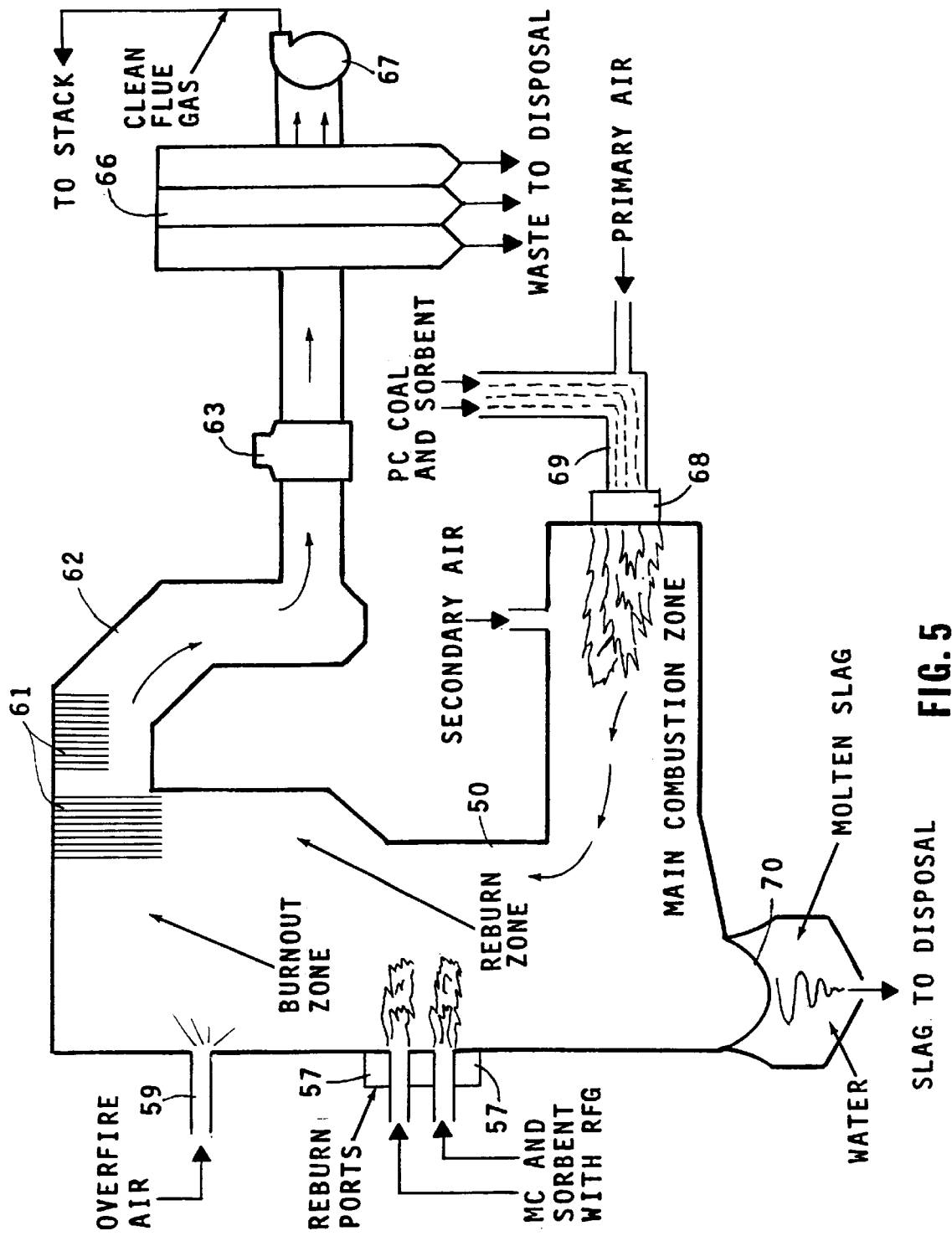
FIG. 5 is a schematic drawing of a cyclone boiler which may be employed in the system of the invention.
Figure 6:
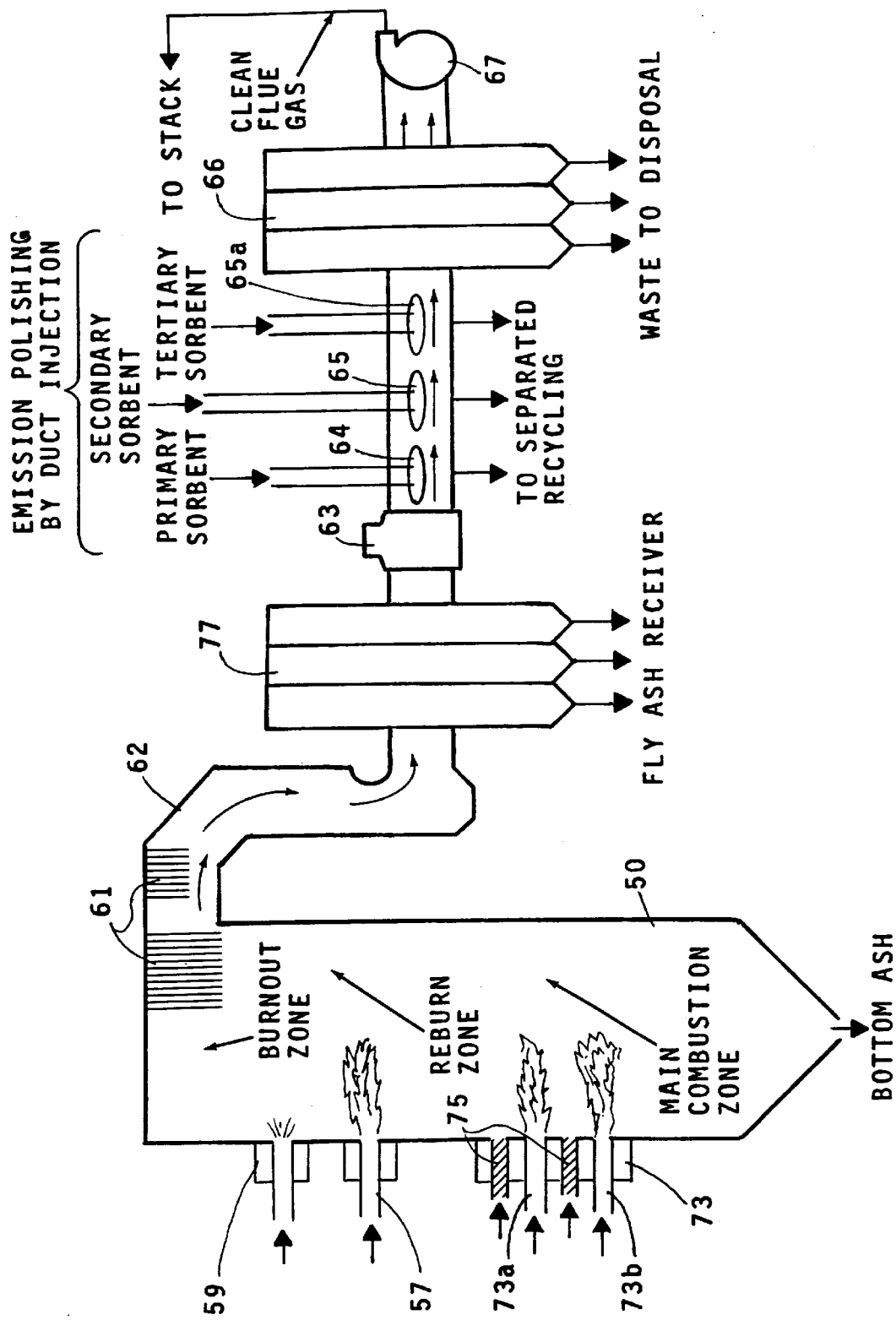
FIG. 6 is a schematic drawing of a wall fired boiler which may be employed in the system of the invention.

FIGS. 4–6 illustrate the use of the micronized homogenized surface modified particles with effective sorbent additive, if desired as fuel in various types of boiler systems, such additives being further defined further on in the specification.

Referring now to FIG. 4 a boiler 50 which uses a regular burner 51 is shown. This boiler has a first main fuel port 54 into which pulverized coal fuel is fed and a second main fuel port 53 into which air is fed. In the event that micronized coal is used along with the pulverized coal, it is fed into port 52 using recycled repressurized flue gas as a carrier. Micronized coal which is surface modified and with a sorbent added can also be introduced into port 52. The micronized coal and its variations are carried into the burner with recycled fuel gas to moderate its rate of combustion. The fuel burns primarily in the main combustion zone 55 and ash developed is unloaded for disposal through the bottom 56 of the boiler.

If further reduction of $NO_x$ is desired, micronized coal in a recycled flue gas carrier is injected into the boiler through reburn port 57 to a reburn burner to create a fuel rich reduction zone in the reburn zone 58. Overfire air is injected through port 59 above the reburn zone to provide an air rich environment for the burnout. In the event that additional $NO_x$ and $SO_2$ reduction is required sorbent may be injected into the boiler through port 60.

From the burnout zone, the combustion gases pass through ducts lined with the secondary heat exchangers 61 in economizer 62. It is to be noted that the primary heat exchangers are the pipes of the water walls in the boiler. The $NO_x$ and $SO_2$ emissions are further reduced by passing the flue gases through air pre-heater 63 to elevate their temperature to facilitate reaction with duct injected sorbent 64 and the humidification of the sorbent through inlet 65. The flue gases are then conveyed through electrostatic precipitator 66 to eliminate any residual solid particles, such particles being conveyed from the bottom of the precipitator for disposal. The cleaned gases are expelled by forced draft fan 67 to a stack.

Referring now to FIG. 5, a boiler 50 using a cyclone burner 68 is illustrated. Primary air and pulverized coal fuel with admixed sorbent are fed into the cyclone burner 68 of the boiler 50 through inlet port 69. The main combustion zone is hot enough to melt the ash to produce a liquid slag which is released through slag tap 70 and granulated in water to form solid slag pellets which are fed out for disposal. Otherwise this device operates in the same manner as that of FIG. 4, like numerals being utilized to identify like components.

Referring now to FIG. 6, a wall fired boiler 50 with a low $NO_x$ burner is illustrated. In this boiler, the combustion of the fuel is staged through the control of air available in the burning process.

Pulverized coal fuel and air are fed into inlet 73b and micronized coal with sorbent and repressurized recycled flue gas being fed into inlet 73a of low $NO_x$ burner 73. Secondary air is fed into inlets 75, two of such inlets being provided to assist in the proportioning of the available air for the staged combustion. The combustion gases exit the boiler and pass through the heat exchangers 61 of economizer 62 to baghouse 77 where fly ash is filtered out and disposed of. From the baghouse the gases are processed in the same general manner as for the previously described boilers.

For the reduction of $NO_x$ in the main combustion zone of the boiler, micronized coal may be used with recycled flue gas as an inert carrier without further surface modification, in combination with pulverized coal as a replacement fuel. The surface modification with magnesium acetate, or other soluble magnesium salt, assists in the binding of nitrogenous compounds present in the micronized coal fuel and further lowering of $NO_x$ generated from such fuel on combustion ("fuel $NO_x$"). After polishing the surface of the micronized coal with ethylene glycol or other polyhydroxy compound, the particles become more receptive to binding hydrophilic additives in the form of complex compounds.

After polishing the micronized coal particles with ethylene glycol, micronized hydrated lime may be added as sorbent in the apparatus of FIG. 2 followed by homogenizing and additional new surface creation in the apparatus of FIG. 3. When micronized coal with micronized hydrated lime as above is conveyed with recycled flue gas into the main combustion zone of a boiler, hydrogen gas is generated from the reaction of the hydrated lime with coal at the combustion temperature, further reducing the $NO_x$ otherwise formed. In such process, the hydrated lime is converted into calcium oxide and the coal is converted into carbon monoxide, an additional $NO_x$ scavenger.

After polishing the micronized coal particles with ethylene glycol, a micronized complex of limestone-urea may be added as sorbent. When this compounded material is conveyed with recycled flue gas into the main combustion zone of a boiler, hydrogen and carbon monoxide are generated from the urea portion of the compound, such decomposition of urea being catalyzed by limestone and resulting in an enhanced reduction of $NO_x$. The micronized coal, polished with ethylene glycol with calcium carbonate-urea additive may also be used in the reburn process for a superior reduction of $NO_x$ in the flue gases when compared to the injection of micronized coal itself.

For the combined reduction of $NO_x$ and $SO_2$ in the main combustion zone of a boiler by the in situ generation of $CaC_2$, superior results are obtained with a micronized coal polished with ethylene glycol and with micronized limestone or micronized hydrated lime as added sorbent by the processes shown in FIG. 2 followed by treatment in accordance with FIG. 3, as compared with the co-firing of separately fed micronized coal and micronized limestone, described in my U.S. Pat. No. 5,695,130. The formation of the $CaC_2$ active scrubbing ingredient in the fire zone of the boiler, may be further enhanced by catalytic amounts of calcium chloride, bound to the micronized limestone or the micronized hydrated lime, such catalyst being added as an aqueous solution to the micronized coal-ethylene glycol-added sorbent combination in the homogenizer-micronizer of FIG. 3.

For obtaining $NO_x$ and $SO_2$ removals that exceed the +90% removal level and for removing the additional acid gases($SO_3$, hydrogen chloride and hydrogen fluoride) from the already cleaned flue gas, and the absorption of the air toxics present therein(compounds of mercury, cadmium, arsenic, selenium, and vanadium), sequential duct injections are required as in the system of FIG. 6. This involves the use of injection conduits 64,65, and 65a necessitating the addition of reagents containing calcium chloride, its solid complexes with ammonia and urea, and ancillary alkaline reagents as follows:

| (FIG. 6, 64) | (FIG. 6, 65) | FIG. 6, 65a |
|---|---|---|
| (1) Hydrated Lime Slurry | Calcium Chloride-Ammonia Slurry | Calcium Chloride Solution |
| (2) Calcium Chloride-Urea Slurry | Hydrated Lime Slurry | Sodium Carbonate-Calcium Chloride Sol. |
| (3) Hydrated Lime Slurry | Limestone-Calcium Chloride Slurry | Sodium Carbonate Solution |

As an added benefit in the flue gas treatment with the above duct injections, following $NO_x$ and $SO_2$ removal in the main combustion zone or the reburn zone of a boiler with the micronized compounds of the present invention, any ammonia slips that may occur are absorbed before the cleaned flue gases exit to the stack. The trace air toxics compounds in the flue gases form double salts with the calcium chloride or are absorbed by the alkaline reagents employed as indicated above.

While the invention has been described and illustrated in detail, it is to be clearly understood that this is intended by way of illustration and example only and not by way of limitation, the scope of the invention being only by the terms of the following claims.

I claim:

1. A system for comminuting solid particles and polishing the comminuted particles comprising:

a chamber;

means for feeding solid particles into said chamber;

a source of pressurized gas, gas from said pressurized source being fed into the bottom of said chamber;

a stationary velocity head having an inverted semi-ellipsoidal shape located near the bottom of said chamber, said velocity head distributing the pressurized gas flow in the form of an annulus to provide a uniform air curtain which is directed upwardly along the inner wall of the chamber;

A plurality of rotors mounted in said chamber, said rotors generating a centrifugal driving force on the gas for comminuting the particles as they are driven upwardly past the ends of the rotors, said comminuted particles consisting of micronized coal;

a plurality of semi-permeable rotatable screens mounted in said chamber above said rotors;

motor means for rotatably driving said rotors and said screens;

said particles being driven from said rotors against said screens with the smaller particles passing therethrough and the larger particles being driven back to the rotors for further comminution, said screens generating vertical spiral gas vortices which further comminute the particles;

an aqueous solution selected from the class consisting of polyhydroxy compounds, ethylene glycol and magnesium acetate being sprayed into said chamber for surface modifying the comminuted particles; and means for expelling the surface modified comminuted particles from said chamber.

2. The system of claim 1 wherein said screens have 4–60 mesh.

3. The system of claim 1 and further including gas flow enhancers installed along the inner walls of said chamber.

4. A system for comminuting solid particles and lowering their $NO_x$ and $SO_2$ emissions when they are burned comprising:

a chamber;

means for feeding said solid particles into said chamber:

a source of pressurized gas, gas from said pressurized source being fed into the bottom end of said chamber;

means for providing uplifting pressure for driving said gas and said particles upwardly;

a plurality of semi permeable screens rotatably mounted in said chamber;

motor means for rotatably driving said screens;

said particles being driven upwardly against said screens with the smaller particles passing therethrough and the larger particles being driven down for further comminution, said screens generating vertical spiral gas vortices which further comminute the particles;

means for polishing said particles comprising an aqueous solution selected from the class consisting of polyhydroxy compounds, ethylene glycol and magnesium acetate sprayed into said chamber; and means for expelling the comminuted polished particles from said chamber.

5. The system of claim 4 and including a plurality of said screens having 6–10 mesh.

6. The system of claim 4 wherein the rotational velocity of the screens is 3000–5000 rpm.

7. The system of claim 4 and further including a second chamber similar to the first chamber, the comminuted particles expelled from the first chamber being further comminuted in said second chamber.

8. The system of claim 4 wherein said means for driving said gas and said particles upwardly includes a stationary velocity head in the shape of an inverted semi-ellipsoid located near the bottom of said chamber, said velocity head distributing the pressurized flow of air entering the chamber in the form of an annulus to provide a uniform air curtain directed upwardly along the inner wall of the chamber.

9. A method for comminuting solid particles comprising the steps of:

feeding said particles into a chamber;

feeding compressed gas into the bottom of said chamber;

generating uplift pressure on said compressed gas to drive said gas and said particles upwardly in said chamber;

comminuting the particles by driving them through vertical spiral gas vortices generated by a plurality of rotating semi-permeable screens, the smaller particles passing through the screens and the larger particles being driven back for further comminution, said particles consisting of micronized coal;

feeding an aqueous solution selected from the class consisting of polyhydroxy compounds, ethylene glycol and magnesium acetate into said chamber for surface modifying the comminuted particles; and expelling the comminuted particles from the chamber.

10. The method of claim 9 wherein said uplift pressure on said compressed gas is generated by passing the gas past a stationary velocity head having an inverted semi-ellipsoidal shape, said velocity head distributing the flow of gas in the form of an annulus to provide a uniform air curtain directed upwardly along the inner walls of the chamber.

11. The method of claim 9 wherein the comminuted particles expelled from said chamber are fed to the main combustion zone of a coal burning boiler, said particles being further surface modified by the addition of a micronized sorbent prior to entering said combustion zone to reduce the $NO_x$ emissions of the combusted fuel.

12. The method of claim 11 and further including the surface modification of said comminuted particles by the addition of a micronized sorbent prior to entering said combustion zone to reduce the $SO_2$ emissions of the combusted fuel.

13. The method of claim 12 wherein the surfaces of the comminuted particles consisting of micronized coal are modified by injecting a sorbent into the particles selected from the class consisting of micronized limestone and micronized hydrated lime, said sorbent being conveyed by recycled flue gas to the boiler combustion zone.

14. The method of claim 13 and additionally including adding catalytic amounts of calcium chloride to said sorbent.

15. The method of claims 11 and 12 and additionally including the step of removing residual acid gases and absorption of air toxics in the cleaned flue gas by injecting calcium chloride into the cleaned flue gas.

16. The method of claim 15 and further including the injection into the flue gas of reagents consisting of calcium chloride, complex compounds of calcium chloride, said complex compounds including a substance selected from the class consisting of ammonia, urea, and limestone, and further including the injection of alkaline reagents selected from the class consisting of hydrated lime and sodium carbonate, prior to venting the finished clean flue gases.

17. The method of claim 11 wherein the surfaces of the comminuted particles are further modified by injecting a hydrogen generating sorbent into the particles selected from the class consisting of micronized hydrated lime and micronized limestone-urea complex.

18. The method of claim 9 and further including the step of feeding the comminuted particles expelled from the chamber into the reburn zone of a boiler and further modifying said particles in said boiler by injecting into said particles a hydrogen generating sorbent consisting of micronized limestone-urea complex.

\* \* \* \* \*